Dec. 22, 1931.  H. C. ELIASON  1,838,053

MARINE BEARING PACKING AND LUBRICATION

Filed Feb. 23, 1928   2 Sheets-Sheet 1

Inventor.
Henry C. Eliason.

Dec. 22, 1931.   H. C. ELIASON   1,838,053
MARINE BEARING PACKING AND LUBRICATION
Filed Feb. 23, 1928   2 Sheets-Sheet 2

Inventor.
Henry C. Eliason

Patented Dec. 22, 1931

1,838,053

UNITED STATES PATENT OFFICE

HENRY C. ELIASON, OF BALTIMORE, MARYLAND, ASSIGNOR TO MARY N. ELIASON, OF BALTIMORE, MARYLAND

MARINE BEARING PACKING AND LUBRICATION

Application filed February 23, 1928. Serial No. 256,419.

My invention relates to improvements in bearing packings, and especially those embodying means for supplying lubricant to the bearing surface under pressure and it consists in the combinations, constructions and arrangements herein described and claimed.

An object of my invention is to provide a lubricating bearing which will provide a structure affording complete sealing to the ingress of dust, grit, water or other foreign matter which would detrimentally affect the bearing surfaces.

A further object of my invention is to provide a bearing embodying a pressure feed, thus insuring complete distribution of lubricant to the bearing surface, which is simple in construction and efficient in operation.

Other objects and advantages will appear in the following specification, and the novel features of the invention will be particularly pointed out in the appended claim.

My invention is illustrated in the accompanying drawings, forming a part of this application, in which, Figure 1 is a fragmentary side elevation of a feathering paddle wheel embodying my bearing.

In the illustration of one application of my invention, the bearing is shown supporting a paddle 1 of a well known construction of feathering paddle wheel. The paddle is shown supported by brackets 2, and carrying trunnion 3. Through the trunnion 3 there is disposed a bearing shaft 4. It is not thought essential that the operation of the feathering action of the paddle be described in detail, since this operation will be readily understood by those versed in the art.

Figure 3:
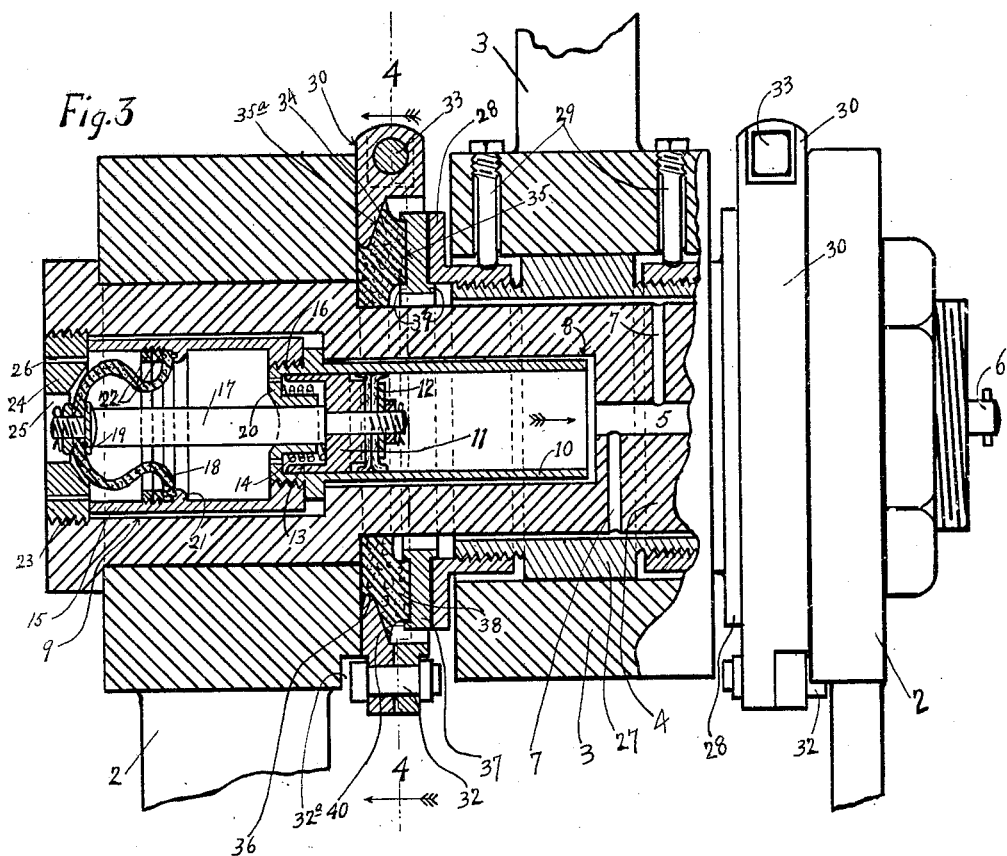
Figure 3 is a cross section partly in elevation of the bearing on the line 3—3 of Figure 1.
Figure 4:
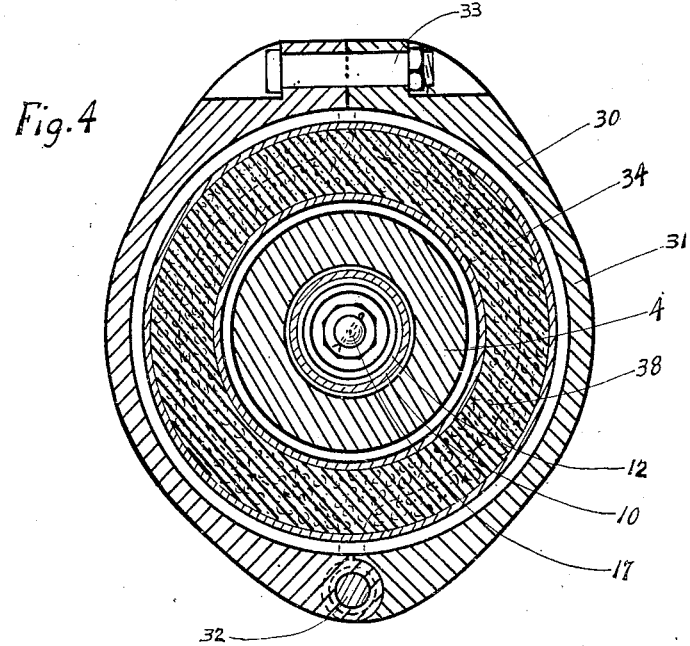
Figure 4 is a cross section on the line 4—4 of Figure 3.

For a clear understanding of the construction of my bearing, reference is made to Figure 3 of the drawings, where it will be clearly seen that the bearing shaft 4 is provided with a longitudinal bore 5, starting from a grease gun connection 6 and extending toward the opposite end to a point slightly beyond the center of the bearing. Lubricant feeding passages 7 are suitably formed in the shaft communicating with the bore 5. The bearing shaft 4 is formed with a bore 8 larger in diameter than the bore 5 and being concentric therewith. The bore 8 terminates in an enlarged bore portion 9. A bushing 10 is fitted within the bore 8, and arranged slidable within this bushing there is a piston 11, embodying a cup portion 12 mounted on the piston. The piston 11 is recessed to provide a seat 13 for reception of a coiled spring 14.

Within the bore 9 there is disposed a diaphragm mounting 15, the inner internal portion being enlarged and threaded for engagement upon the threaded portion of the bearing 10, as at 16. The piston 11 carries a rod 17, this rod extending within the diaphragm housing, and is secured centrally of a diaphragm 18 as at 19. A cap 20 is threadedly engaged with the diaphragm mounting 15, and arranged to enclose the spring 14, and exert pressure toward the bore 5.

The diaphragm mounting is provided intermediate its length with an internal boss 21, suitably serrated so that when the diaphragm 18 is disposed thereon and the clamping ring 22 jammed against the diaphragm it will be securely held. The connection between the diaphragm and the boss 21 must be air and water tight construction, and in the present instance, this is accomplished by threading the interior of the diaphragm mounting and screwing the clamps 22 snugly against the diaphragm.

The bore 9 terminates in a threaded portion 23 so as to receive a retaining plug 24, adapted to secure the parts in their proper relations.

The plug 24 is suitably apertured as at 25 for reception of socket wrench, for manipulating the plug for tightening or loosening the parts in their respective relations. Also, the plug 24 may be provided with circumferentially arranged apertures 26, which will permit free passage outward of the water or sand, on the rearward movement of the diaphragm.

Figure 1:
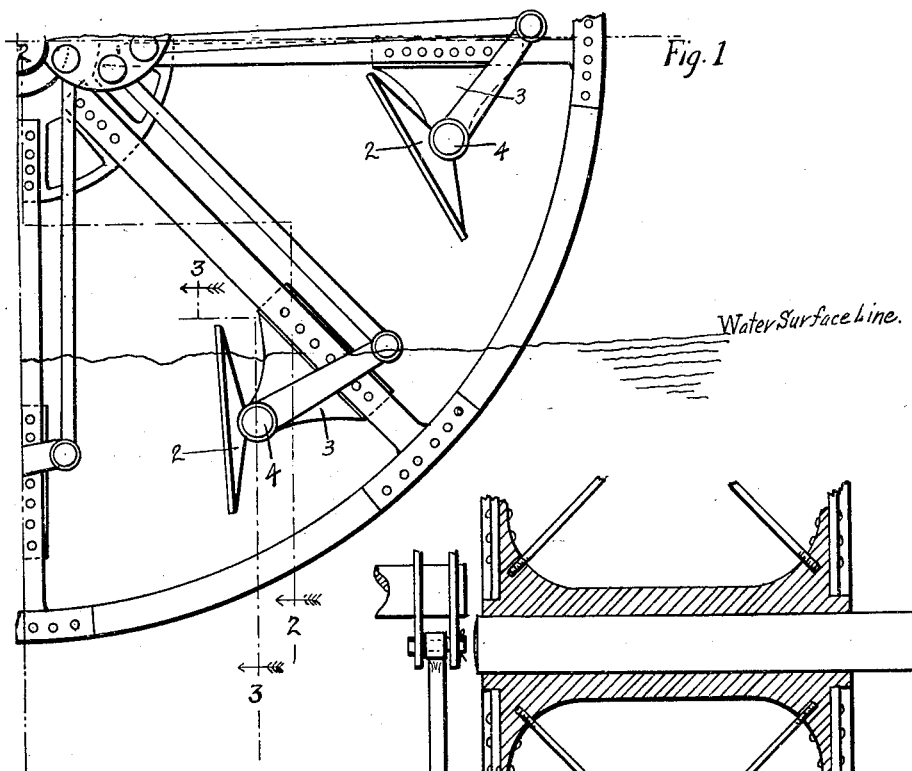
Figure 2:
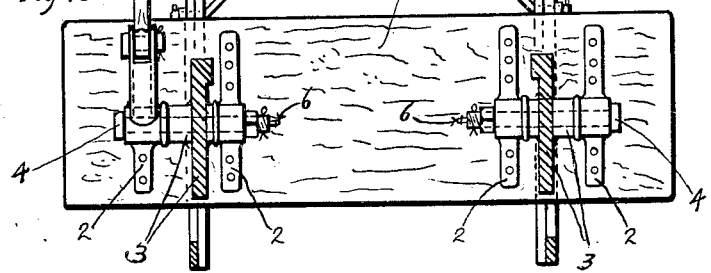
Figure 2 is a cross section on the line 2—2 of Figure 1.

The bearing shaft 4 and its associated lubricant dispensing gun is supported by brackets 2 at its ends, as clearly shown in Figure 2, and intermediate its length the trunnion 3 is disposed. The trunnion 3 is provided with a bushing 27, this bushing being reduced at each end, the reduced portion being threaded for the reception of a gland 28. In order that the gland 28 is properly held in adjusted position, a set screw 29 is provided, threadedly engaged through the trunnion 3, and impinging the gland 28 as shown.

In order to establish a water and oil tight connection between the trunnion 3, bearing 4 and bracket 2, a hinged packing 30 is disposed between the bracket 2 and trunnion 3. The packing ring 30 comprises two annular sections 31, hinged by a bolt 32, the free ends of the section 31 being provided with planiform faces adapted to produce a snug fit when brought into mutual contact by the bolt 33. The bracket 2 is recessed at 32—a for reception of the head of the bolt 32 and by this construction, it will be apparent the ring 30 is held against rotation. An elastic compression ring 34 is disposed within the hinged section 31, one face of this ring being formed with a smooth tapered face 35 and terminating in a shoulder 36. It should be noted that the sections 31 are suitably formed for reception of the elastic ring and its retention, after the bolt 33 has been tightened, thus obtaining a snug fit between the elastic packing and bearing bolt 4 at its point of contact. The opposite side of the elastic ring is enlarged somewhat so as to provide a substantial body portion at the point where greatest compression will take place, upon final adjustment. The enlarged portion is so proportioned as to be spaced from the bearing shaft 4 a suitable distance and likewise stops short of the inner edge of the section 31, and terminates in a planiform face 35—a for a purpose which will appear. A free floating friction ring 37 is interposed between the face of the bushing 28 and the enlargement 38 of the elastic ring 34. This ring is preferably provided with annular shoulders 39 around its inner periphery for engagement within the bushing 28 and compression ring 34. Also, the outer portion of the ring 37 which lies next to the elastic ring 34, may be provided with an annular shoulder 40, as shown in Figure 3.

In order to make adjustment in my improved packing, it is only necessary to loosen the bolt 33 and set screw 29. Upon loosening of the bolt 33, the compression ring 34 will tend to assume its normal shape, that is to say, it will expand laterally, and then, by unscrewing the gland 28, it will be seen that the friction ring 37 will be forced toward the compression ring 34 causing a radial expansion as well as longitudinal compression of the elastic ring. The set screw may then be screwed into engagement with the bushing, and the bolt 33 tightened. Thus it will be seen that a fluid-tight seal is provided between the brackets 2, bearing 4, and trunnion 3.

In operation, lubricant is supplied to the reservoir by means of a grease gun, connection being made at 6. The lubricant enters the reservoir by virtue of the bore 5, forcing the piston and its associated diaphragm rearwardly and causing compression of the spring 14. The rearward movement of the diaphragm will relieve any pressure tending to counteract the filling operation and also expels any water within the diaphragm mounting.

Under expansion of the spring 14 and the tendency of the diaphragm to return to its normay position, the piston will be forced in the direction of the arrow, causing the lubricant to seek egress through the passages 7 and thence to the bearing surface.

While I have shown and described the preferred form of my invention it is to be understood that I am aware of the fact that changes may be made in the general structure and arrangement of the parts by those skilled in the art without departing from the spirit of my invention as indicated by the appended claim.

What I desire to secure by Letters Patent and claim is:—

In a fluid-sealed bearing, the combination of a bearing shaft, a trunnion thereon, supports for said shaft, a packing ring interposed between said support and said trunnion, said ring comprising a hinged ring member, an elastic member within said ring member, a free floating ring, said ring being in snug engagement with said elastic member, and means upon said bearing shaft for forcibly engaging and holding said free ring and elastic member in tight abutting relation.

HENRY C. ELIASON.